United States Patent Office 3,406,132
Patented Oct. 15, 1968

3,406,132
METHOD OF PREPARING PHENOLIC ACCELERATOR/AROMATIC HYDROCARBON/FORMALDEHYDE CONDENSATION PRODUCT/FILLER/ACID CATALYST THERMOSETTING MOLDING RESINS
Edgar C. Winegartner, Baytown, Tex., assignor to Esso Research and Engineering Company
No Drawing. Filed May 21, 1965, Ser. No. 457,809
7 Claims. (Cl. 260—17.2)

ABSTRACT OF THE DISCLOSURE

Solid, thermoplastic, thermosetting molding resin powder is prepared by heating together at 50° to 280° F., 0 to 250 p.s.i.g., and 3 to 600 minutes, a mixture of a filler, a phenolic accelerator, an acid catalyst, and a liquid condensation product of aromatic hydrocarbon and formaldehyde followed by cooling, solidifying and comminuting the product.

---

The present invention relates to the manufacture of a thermosetting molding resin. More particularly, the present invention relates to the manufacture of a thermosetting molding resin from the condensation product of formaldehyde with an aromatic hydrocarbon. In its most specific aspects, the present invention relates to a molding resin which is comminuted while at a thermoplastic stage and which is thermosetting under molding conditions.

Thermosetting resins may be produced from aromatic-formaldehyde condensation products by reacting the condensation products with phenol in the presence of an acid catalyst. The thermosetting resins, however, are generally liquids which cannot be conveniently handled in the compression and transfer-molding equipment currently used by industry. A solid powder is preferred for use in this equipment. The present invention relates to a method of producing a powdered thermosetting resin which can be used in the compression or transfer-molding equipment currently employed by industry, and which powder is thermoplastic but which is thermosettable under conditions employed in the compression or transfer-molding process.

It has been found that the aromatic-formaldehyde-phenol resins of the present invention pass through a normally solid, thermoplastic state before reaching the thermosetting, cross-linking stage of the reaction. The solid, thermoplastic materials comprise the present invention and are characterized by having a melting point of less than 300° F., but being hard, brittle materials at room temperature and thus easily comminuted to obtain a powder for use in compression or transfer molding. The powdered thermoplastic, thermosettable molding resin of the present invention is generally white in appearance.

The molding resin of the present invention is made up of several components: the aromatic-formaldehyde liquid condensation product and, added thereto, the quantities of fillers, accelerators, and catalysts which are desired in the final thermosetting resin powder. The admixture, a sticky, gummy mass, is heated to a temperature between 50° F. and 280° F. for a period of time sufficient to partially react the aromatic-formaldehyde resin and the accelerator so as to obtain a product which is thermoplastic and solid at room temperature. It has been found that during the course of the reaction, the viscosity of the mixture first decreases greatly, and then begins to increase as polymerization takes place. The reaction is terminated before a dark-colored thermoset material is formed, since premature thermosetting would deprive the material of its utility as a molding resin. The termination point is also chosen to obtain a thermoplastic material whose viscosity under molding conditions is sufficiently low so that the resin will flow in the molding equipment.

The time at which the reaction should be terminated must be determined by experiment for each formulation, since the time period required depends not only upon the temperature at which the reaction is to take place, but also upon the nature and amount of catalyst and accelerator used, and the nature of the aromatics-formaldehyde condensation product which is employed.

It is a simple matter, however, to determine the length of reaction time which is to be employed for any given resin and catalyst system, since a single experimental run will provide sufficient data for guidance in future preparations.

Turning now to the more specific aspect of the present invention, the variables which are of note in the present invention are as follows:

(1) Aromatics-formaldehyde condensation product;
(2) Accelerator;
(3) Catalyst; and
(4) Filler.

Each of these will be considered in order below.

AROMATICS-FORMALDEHYDE CONDENSATION PRODUCT

The aromatics-formaldehyde condensation product employed in the present invention is obtained by the condensation reaction of formaldehyde with an aromatic hydrocarbon chosen from the group consisting of methyl-substituted aromatics, such as toluene, xylene, trimethyl benzenes, and tetramethyl benzenes, as well as methylated compounds of the naphthalene series or of higher condensed ring aromatic series. The methyl-substituted benzene aromatics are preferred, and xylene is the preferred aromatic hydrocarbon. The xylene may be employed as a single isomer (preferably metaxylene, which is more reactive than the ortho- or para-isomers), or the xylene may be employed as an admixture of the three isomeric xylenes with ethyl benzene, as is commonly obtained in refinery operations.

The formaldehyde which is utilized in obtaining the condensation product can be used in a number of different forms. Solid paraformaldehyde or gaseous formaldehyde are preferred embodiments since they are more conveniently handled than the other sources of formaldehyde. However, various formalins (from 37 to 55 wt. percent aqueous solutions of formaldehyde), trioxane, etc., may be utilized as the source of formaldehyde.

The aromatic hydrocarbon and formaldehyde are reacted in the presence of an acidic catalyst, such as a 20 to 80 wt. percent aqueous sulfuric acid which is employed at low concentrations, for example, at about 2 to 10 wt. percent, based on the aromatic hydrocarbon.

The condensation reaction is accomplished during a residence time from about 15 minutes to one hour, at a temperature from 160° F. to 250° F., and at a pressure chosen to keep the reactants generally in the liquid phase. The product may be neutralized with a suitable base, if desired.

The product of the condensation reaction may contain from about 8 to 18 wt. percent oxygen, exhibit a molecular weight of from 350 to 3000, and a viscosity from 25 to 1000 SSU at 210° F. The product is a liquid having a color from water clear to a straw color.

A xylene-formaldehyde condensation product may be chosen as typical, and below are given inspection data on different products having essentially the same oxygen content.

TABLE I.—PROPERTIES OF XYLENE-FORMALDEHYDE CONDENSATION PRODUCT

|  | 1 | 2 |
|---|---|---|
| Molecular weight | 510 |  |
| Specific gravity, 60/60° F | 1.097 | 1.079 |
| Oxygen content, wt. percent | 16.1 | 16.9 |
| Viscosity, SSU at 210° F | 150 | 92 |
| Color, Gardner | 1 | 9 |

Where toluene is used as the aromatic hydrocarbon, the catalyst system for obtaining the condensation product is preferably an admixture of glacial acetic acid with sulfuric acid, to obtain a catalyst system having 0.3 to 1.0 part by weight of 70 wt. percent aqueous $H_2SO_4$ for each part by weight of glacial acetic acid.

Typical condensation product of toluene and formaldehyde are shown below.

TABLE II.—PROPERTIES OF TOLUENE-FORMALDEHYDE CONDENSATION PRODUCTS

|  | 1 | 2 |
|---|---|---|
| Specific Gravity, 60/60° F | 1.062 | 1.064 |
| Color, Hellige | 7 | 7 |
| Viscosity, SSU at 210° F | 44.0 | 43.1 |
| Oxygen, wt. percent | 11.0 | 10.1 |

Thus, it is seen that the condensation product may employ any of a number of aromatic hydrocarbons, but in order to be thermosetting, the condensation products should contain a minimum of 8 wt. percent oxygen.

ACCELERATOR

The material which is used as an accelerator is a phenol or a phenol-like substance, chosen from the group consisting of phenol, cresol, resorcinol, pyrogallol, etc. The ratio of the accelerator to the condensation product is within the range of .375 to 0.75 by weight. It is preferred that the ratio of the accelerator to condensation product be about 0.5.

CATALYST

The catalyst which is incorporated into the molding resin performs two functions. First, it catalyzes the "advancing" reaction of the condensation product with the accelerator, increasing the viscosity and producing the thermoplastic solid which is comminuted, and also catalyzes the ultimate thermosetting reaction under the molding conditions. The quantity of catalyst employed in the condensation portion of the reaction may be much smaller (e.g., 0.01%) than the quantity employed in the thermosetting reaction (e.g., 4%) in order to facilitate control of the condensation. In such a case the balance of the acid would be added to the cooled melt just prior to solidification, as hereinafter more specifically described. Since the acid remains in the resin and is carried into the molding apparatus, an aqueous solution of sulfuric acid, although operable, is not preferred, because the evolution of steam within the molding vessel is difficult to control and may lead to deformation or injury to the article being molded. Therefore, the preferred acid catalyst for use in the molding resin is an aromatic sulfonic acid such as xylenesulfonic acid, which is employed in amounts from about 2 to 8 wt. percent (preferably about 4 wt. percent) based on the total of the weights of the accelerator and the aromatics-formaldehyde condensation product. Other suitable specific acid catalyst are phenolsulfonic acid, toluenesulfonic acid, and benzenesulfonic acid.

FILLER

The final constituent of the molding resin of the present invention is a filler. The filler is used to improve the physical properties of the final molded product. Suitable fillers are chosen from the group consisting of carbon black, wood flour, asbestos, and siliceous materials. From 10 to 200 wt. percent of filler (based on the total of the weights of accelerator and aromatics-formaldehyde condensation product) is employed, preferably about 100%. The preferred filler is asbestos. The filler may be used in amounts of 10 to 50 parts by weight.

RESIN ADVANCING REACTION

The resin is prepared by admixing from 10 to 100 parts by weight of the filler and from 0.01 to 8 parts by weight of the acid catalyst, with 100 parts by weight of the accelerator-aromatic hydrocarbon-formaldehyde condensation product mixture. The accelerator-to-condensation product weight ratio will be within the range of 37.5 to 75 parts per 100 parts. The preferred ratio is 50 parts per 100 parts.

The admixture is reacted at a temperature of 50° F. to 280° F., and a pressure of 0 to 250 p.s.i.g. for a time period sufficient to advance the resin to the thermoplastic stage. This stage is determinable by experiment, and the time period required to attain the stage, although constant for each given set of reactants and catalyst system, will vary as the nature of the condensation product, the catalyst, the accelerator, and the temperature of reaction are varied. Once these variables have been set, however, the time of reaction to attain the desired degree of advanced resin is easily determinable by experiment.

After reacting the admixture to the desired point, the reactants are cooled, the catalyst content adjusted to the desired level for thermosetting (2 to 8%), and solidified, for example, by discharging the reaction vessel onto a cooled surface. The reaction product will be a brittle solid at room temperature and is easily comminuted to obtain a white powder which is used as the molding resin. The comminuted powder preferably will exhibit a particle size range from about 4 to 350 mesh, preferably within the range of 50 to 200.

In order to illustrate the present invention, the following examples are given which illustrate both the preparation of the molding resin and the use thereof.

Example 1

One hundred grams of a xylene-formaldehyde condensation product having a molecular weight of 510 and specific gravity at 60° F. of 1.097, an oxygen content of 16.1% and a viscosity of 210° F. of 150 SSU are mixed with 75 grams of phenol. Six grams of metaxylenesulfonic acid dihydrate dissolved in 2 grams of methanol are added to the mixture and the temperature slowly raised from room temperature to 120° F. The temperature is held at 120° F. for approximately 5 hours by removal of heat from the reaction mixture and then 100 grams of asbestos fibers are added with stirring. The mixture is cooled and the resulting product is a solid, tan-colored material. This material is broken into coarse lumps and ground on a water-cooled roll mill. The resulting powdered resin is placed in a closed steel mold and heated in a hot press at 350° F. for a period of four minutes. At the end of this time the mold is removed from the press and cooled. The molded product appears similar to molded phenolic resins.

Example 2

One hundred grams of the xylene-formaldehyde resin used in Example 1 are mixed with 50 grams of phenol. The mixture is heated to 220° F. and 0.075 grams of meta-xylenesulfonic acid dihydrate dissolved in 0.675 gram of methanol is added to the mixture. The temperature is held at 220 F. for 140 minutes at atmospheric pressure. The reaction product is then cooled to approximately 120° F., at which temperature 5.925 grams of metaxylene sulfonic acid dihydrate dissolved in 2 grams of methanol are added to bring the total acid content to 4% by weight. The solid product is broken into coarse lumps which are then ground in a water-cooled roll mill to produce a powdered molding resin. The powder is mixed with 75 grams of wood flour and then placed in a closed steel mold and pressed in a hot press at 350° F. for 4 minutes to produce a thermoset product similar to that obtained when using phenolic resins.

It is seen from the description of the invention and the examples above that the present invention relates to a useful, novel, thermoplastic, solid, thermosettable molding resin, and a method of producing it. What is desired to be covered by Letters Patent granted to the inventor hereof should be limited not by the specific examples hereinabove given, but rather by the appended claims.

I claim:

1. A method of preparing a solid, thermoplastic, thermosettable molding resin powder which consists essentially of
    admixing from 10 to 200 parts by weight of a filler chosen from the group consisting of carbon black, wood flour, asbestos, clay, or silica,
    an accelerator chosen from the group consisting of phenol, cresol, pyrogallol, resorcinol, etc.,
    from 2 to 8 parts by weight of an acid catalyst chosen from the group consisting of xylenesulfonic, toluenesulfonic, phenolsulfonic, and benzenesulfonic acid,
    a liquid condensation product of formaldehyde and an aromatic hydrocarbon chosen from the group consisting of toluene, xylenes, durene, hemimellitene, pseudocumene, mesitylene, prehnitene, isodurene and pentamethylbenzene,
    said condensation product having
        an oxygen content of 8 to 18 wt. percent,
        a molecular weight of 350 to 3000, and
        a viscosity of 25 to 1000 SSU at 210 F.,
    the accelerator and condensation product, taken together, totaling 100 parts by weight,
    the accelerator-to-condensation product weight ratio being from 0.375 to .75,
    reacting said admixture
        at a temperature of 50° F. to 280° F.,
        a pressure of 0 to 250 p.s.i.g., and
        for a time period within the range of 3 to 600 minutes, which is sufficient to obtain a thermoplastic product which is solid at room temperature,
    cooling and solidfying said thermoplastic product,
    and comminuting said solid, thermoplastic product to obtain a molding resin.

2. A method of preparing a solid, thermoplastic, thermosettable molding resin which consists essentially of
    admixing a liquid xylene-formaldehyde condensation product having
        an oxygen content of 8 to 18 wt. percent,
        a molecular weight of 350 to 3000, and
        a viscosity of 25 to 1000 SSU at 210° F.,
    with phenol, the phenol-to-condensation product weight ratio being from .375 to .75, the phenol and condensation product admixture comprising 100 parts by weight,
    from 2 to 8 parts by weight of an acid catalyst chosen from the group consisting of xylenesulfonic, toluenesulfonic, phenolsulfonic and benzenesulfonic acid,
    and from 10 to 200 parts by weight of a filler chosen from the group consisting of carbon black, wood flour, asbestos, clay, or silica,
    reacting said admixture
        at a temperature of 50° F. to 280° F.,
        a pressure of 0 to 250 p.s.i.g., and
        for a time period within the range of 3 to 600 minutes, which is sufficient to obtain a thermoplastic product which is solid at room temperature,
    cooling and solidifying said thermoplastic product,
    and comminuting said solid, thermoplastic product to obtain a molding resin.

3. A method in accordance with claim 2 wherein the filler is wood flour.

4. A method in accordance with claim 2 wherein the acid catalyst is xylenesulfonic acid.

5. A method in accordance with claim 4 wherein the filler is wood flour and the acid catalyst is xylenesulfonic acid.

6. A method of preparing a solid, thermoplastic, thermosettable molding resin which consists essentially of
    admixing 100 parts by weight of a xyleneformaldehyde condensation product having
        an oxygen content of 16.1%,
        a molecular weight of 510, and
        a viscosity of 150 SSU at 210° F.,
    50 parts by weight of phenol,
    4 parts by weight of xylenesulfonic acid, and
    50 parts by weight of wood flour as a filler,
    reacting said admixture at a temperature of 120° F., and a pressure of atmospheric, for 300 minutes,
    cooling and solidifying the reaction admixture to obtain a solid, thermoplastic product,
    and comminuting said solid, thermoplastic solid to obtain a molding resin.

7. A method of preparing a solid, thermoplastic, thermosettable molding resin which consists essentially of
    admixing 100 parts by weight of a xyleneformaldehyde condensation product having
        an oxygen content of 16.1%,
        a molecular weight of 510, and
        a viscosity of 150 SSU at 210° F.,
    50 parts by weight of phenol,
    4 parts by weight of xylenesulfonic acid, and
    50 parts by weight of wood flour as a filler,
    reacting said admixture at a temperature of 220° F. and a pressure of atmospheric, for 140 minutes,
    cooling to slightly above the solidification temperature, adding 3.95% xylenesulfonic acid, and solidifying the reaction admixture to obtain a solid, thermoplastic product,
    and comminuting said solid, thermoplastic solid to obtain a molding resin.

References Cited

UNITED STATES PATENTS

| | | | |
|---|---|---|---|
| 1,793,311 | 2/1931 | Ellis | 260—57 |
| 2,237,634 | 4/1941 | Rosen | 260—57 |
| 2,954,360 | 9/1960 | Krzikalla et al. | 260—57 |
| 3,303,167 | 2/1967 | Kakivchi et al. | 260—57 |

FOREIGN PATENTS 890,336  4/1944  France.

WILLIAM H. SHORT, *Primary Examiner.*

E. M. WOODBERRY, *Assistant Examiner.*